INVENTOR
GERARD L. ZOMBER

INVENTOR
GERARD L. ZOMBER
ATTORNEY

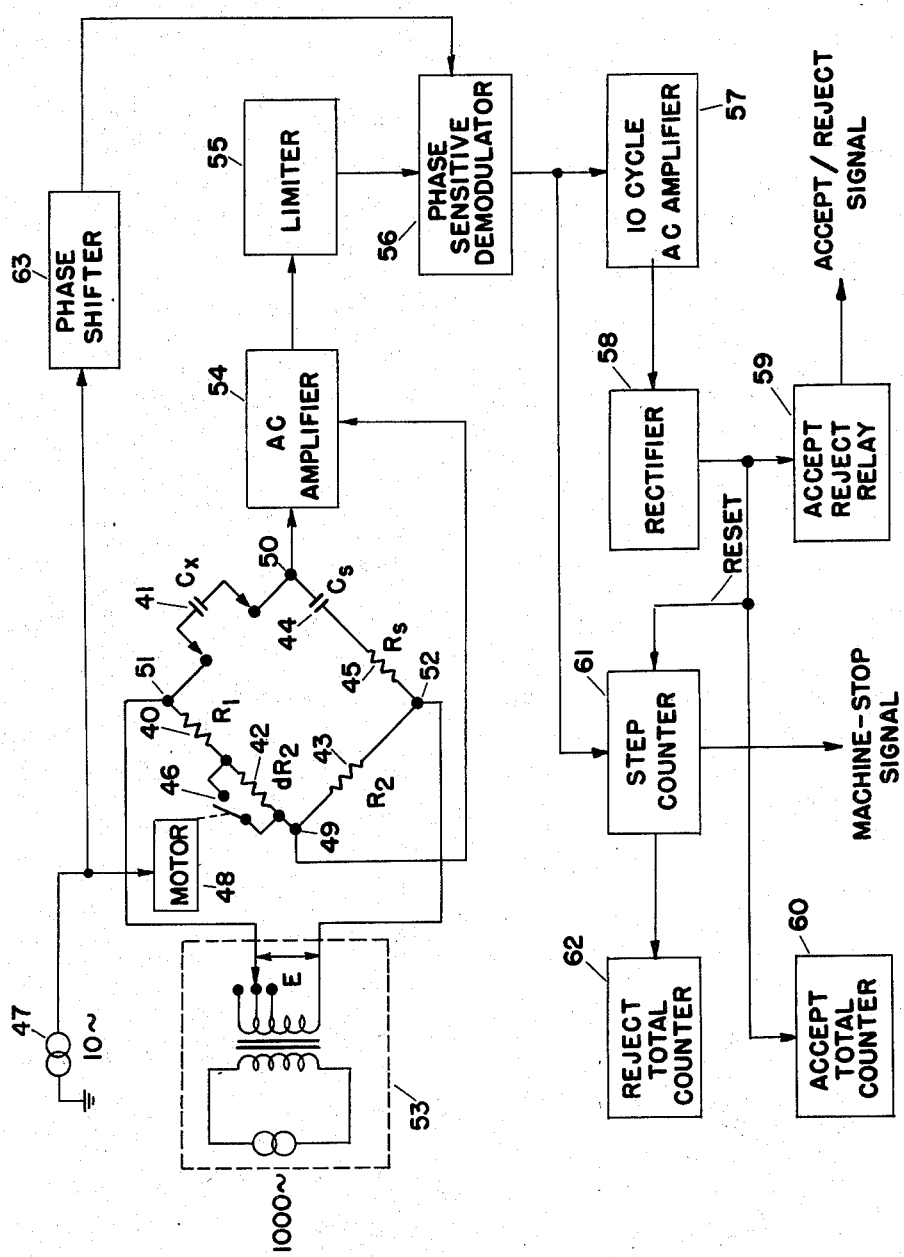

United States Patent Office 2,946,950
Patented July 26, 1960

2,946,950
AUTOMATIC LIMIT BRIDGE

Gerard L. Zomber, Wyckoff, N.J., assignor to ACF Industries, Incorporated, New York, N.Y., a corporation of New Jersey Filed May 28, 1956, Ser. No. 587,753

2 Claims. (Cl. 324—57)

This invention relates to apparatus for use in measuring electrical quantities and, more particularly, to apparatus for indicating whether the value of an electrical impedance is within a given range, and for classifying impedance elements in accordance with the results of the test.

The dominant requirements of the automatic component tester are accuracy and speed of component checking. From a review of previous work and a study of the general problem, it is concluded that a limit type of test would best fit these requirements. In a limit type of check, no effort is made to determine the actual magnitude of the resistance or impedance of the component under test. The limit check determines whether or not the component is within tolerance. Advantages of this type of test are speed, accuracy, and simplicity. Tolerances are easily set without changing the sensitivity of the null detector.

One form of prior art apparatus for limit type of tolerance testing of circuit impedance elements has utilized two separate Wheatstone bridges, wherein the element to be tested was connected in common with the two bridges. The first bridge contained a standard low limit resistance arm, while the other bridge contained the standard high limit resistance arm. The two bridges were then balanced so that current responsive indicating means, connected across each of the bridge circuits, would indicate an unbalance in either of the bridges in the event that the element under test was not within the required tolerance. The use of this apparatus necessarily involved rather tedious adjustment of each of the bridges, since the current flowing through the common arm, containing the element under test, was a combination of the currents from each of the two bridges. A further disadvantage of this apparatus is that it required two indicating means, which had to be correlated in some manner in order to yield a single indication of acceptability for the element under test.

Other types of automatic apparatus for measuring impedance tolerances have not met with extreme success, since the majority of them check either the lower or the upper limit, but not both limits, and few have yielded results with the degree of accuracy which was desired.

One of the objects of this invention, therefore, is to provide novel apparatus for limit checking of an impedance element to determine whether its impedance characteristic is within a given tolerance range.

Another object of this invention is to provide an apparatus for use in testing impedance elements which yields alternating or reversing signals only when the impedance value of the element under test is within predetermined tolerance limits.

A further object of this invention is to provide a completely automatic apparatus for the tolerance testing of circuit impedance elements, wherein the output signal characteristic may be utilized to classify the tested elements in accordance with the results of the circuit test.

One of the features of this invention is the use of an automatic limit bridge of the Wheatstone type, wherein one arm is cyclically adjusted to balance the bridge at the desired upper and lower limits of impedance for the element under test. Thus, the error voltage output of the bridge has a characteristic reversal when the element under test is within the desired tolerance range. If the tested element is outside the desired tolerance range, the error voltage output has a constant characteristic and is utilized to actuate classification apparatus.

These and other objects and features of my invention will become more apparent from the following detailed description when considered in conjunction with the accompanying drawings wherein:

Fig. 4 is an alternate embodiment of the automatic impedance testing apparatus of my invention for use in testing capacitive elements.

Figure 1:
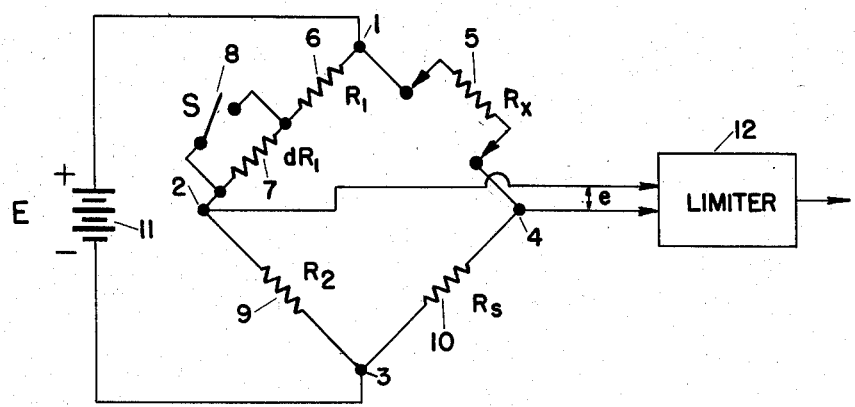
Fig. 1 is a simplified circuit diagram of one embodiment of a limit type Wheatstone bridge used in the apparatus of my invention.

Referring to Fig. 1 of this invention, an automatic limit type impedance tester for use in measuring resistance values is shown in simplified form to comprise a modified Wheatstone bridge circuit. The automatic limit bridge includes four arms coupling terminals 1, 2, 3 and 4 together.

The circuit element 5 undergoing the limit test is coupled between the terminals 1—4 of the automatic limit bridge of my invention. An impedance 10 is coupled between terminals 3—4, having a resistance value equal to the desired or nominal resistance of the element 5 undergoing test. A first resistance 6 in arm 1—2 of the limit bridge is adjusted to balance the bridge when the element 5, undergoing test, is at the minimum value within the desired tolerance range. A second resistance 7, connected in arm 1—2 of the bridge, is of such value that, when added to the resistance of element 6, the total resistance in arm 1—2 balances the bridge when the resistance of element 5 is at the maximum tolerance value within the desired resistance range for the element under test. Circuit element 9 is coupled in arm 2—3 of the bridge and is of an impedance value equal to the total resistance of element 6 plus one-half of the resistance of element 7 (the mean value of the total resistance in arm 1—2). A commutation switch 8 is coupled in shunt with element 7 and when opened and closed at a cyclic rate, for example 10 c.p.s., it alternately causes the bridge to be balanced at its upper and lower limits. A source of voltage 11 is coupled across terminals 1 and 3 of the bridge. An error voltage, which is alternately proportional to the unbalance of the bridge between its upper and lower limits, is obtained from across terminals 2 and 4. The error voltage $e$ output of the bridge is coupled to a limiter 12 (of very high sensitivity).

Figure 2:
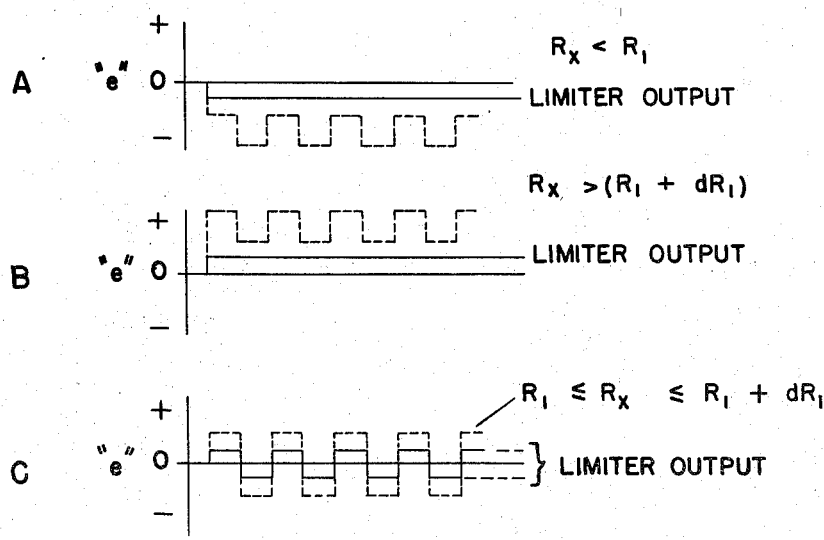
Fig. 2 is a set of curves helpful in explaining the operation of the apparatus constituting my invention.

In operation of the bridge, when the value of the unknown resistance 5 is below the low limit of the predetermined tolerance range, the error voltage output $e$ coupled across terminals 2 and 4 is negative at all times and more negative than the lower limiting level of the limiter circuit 12, as illustrated in Curve A of Fig. 2. Since the resistance of element 5 is then always less than the lower limit of resistance of arm 1—2 and also, obviously, less than the upper limit of the tolerance range, the output of limiter 12 is a negative D.C. signal. Conversely, when the resistance of the element 5 is above the tolerance range, then the error voltage $e$, coupled from terminals 2 and 4, is positive at all times and greater than the positive limiting level of limiter 12, since the resistance of the element under test is then higher than the upper tolerance limit and, obviously, also higher than the lower tolerance limit. It is only when the resistance value of element 5 is within the tolerance limits that the error voltage output of limiter 12 alternates positively and negatively, since then the resistance of the element 5 is above the lower tolerance limit and below the upper tolerance limit and, thus, the polarity of the output voltage, after limiting, changes as the switch 8 is cyclically opened and closed.

Figure 3:
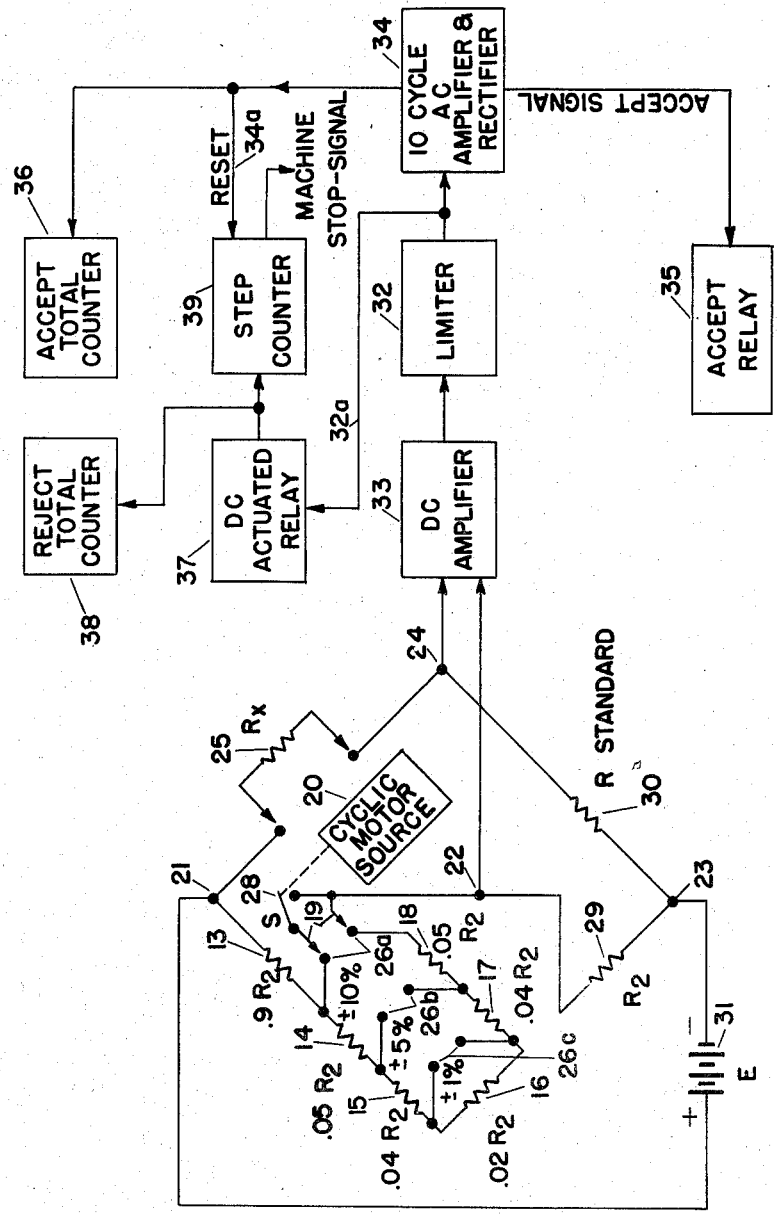
Fig. 3 is a schematic circuit diagram, partly in block form, of an impedance tolerance testing apparatus in accordance with the principles of my invention.

Referring to Fig. 3 of the drawing, an alternate embodiment of an automatic limit bridge, adapted for testing various standard tolerance limits of resistance elements, is shown to comprise a modified Wheatstone bridge having a resistance element 25, which is undergoing test, coupled between terminals 21 and 24. A standard resistance 30, having a nominal resistance value equal to the desired resistance of element 25, is coupled between terminals 23 and 24. A resistance 29 is coupled between terminals 22 and 23. The various resistances, coupled between terminals 21 and 22, form the remaining arm of the automatic limit bridge and are adjusted to obtain various values of resistance tolerance for the arm of the bridge by moving armatures 19 of switch 28 to the various terminals 26a, 26b and 26c. A D.C. voltage source 31 is coupled between terminals 21 and 23.

The plurality of resistances coupled between terminals 21 and 22 are utilized in adjusting the bridge for different tolerance limits. For example, if it is desired to test resistance 25 for a tolerance limit ±10%, switch 28 has armatures 19 coupled to terminals 26a. When switch 28 is open, the bridge arm between terminals 21 and 22 comprises the resistances 13—18 in series. Let it be assumed that resistance 29 corresponds to the desired value of element 25, then resistances 13—18 should be given the following values in proportion to resistance 29, .9, .05, .04, .02, .04, .05. The total resistance in arm 21—22, when armature 19 is coupled to terminals 26a, is equal to 1.10 times the resistance of element 29 or, in other words, equal to the maximum limit of tolerance.

When switch 28 is closed, the bridge arm 21—22 comprises resistance 13, which is .9 times the resistance of element 29 or, in other words, equal to the lower tolerance limit. Thus, when armatures 19 are coupled to terminals 26a and switch 20 is alternately opened and closed, the automatic limit bridge is caused to balance alternately at its high and low tolerance limits. A source 20 of alternating signals causes the commutating switch 28 alternately to open and close.

In order to test element 25 to ±5% tolerance limits, armatures 19 of switch 28 are coupled to terminals 26b. When switch 28 is opened, resistances 13, 14, 15, 16 and 17 are coupled in series between terminals 21 and 22 of the bridge. Thus, arm 21—22 comprises .9 plus .05 plus .04 plus .02 plus .04 times the value of resistance 29, or in other words 1.05 times the value of resistance 29, which is the upper limit of the desired tolerance range. When switch 28 is closed, arm 21—22 comprises resistances 13 and 14 in series or .95 times the value of resistance 29, which is the lower limit of the desired tolerance range.

When it is desired to test element 25 to within ±1% tolerance limits, armatures 19 are coupled to terminals 26c. When switch 28 is in the open position, arm 21—22 of the bridge comprises resistances 13, 14, 15 and 16 in series, which total 1.01 times the value of resistance 29. When switch 28 is closed, arm 21—22 comprises resistances 13, 14 and 15, which total .99 times the value of resistance 29.

Thus, it is apparent that the position of armatures 19 determines the tolerance limits being tested and the position of switch 28 determines whether the upper or lower tolerance limit is being tested. It is equally apparent that, by similar design, other limits than those shown may be provided.

A source of voltage 31 is coupled across terminals 21 and 23. As heretofore explained, switch 28 is opened and closed at a 10-cycle rate by the output of motor source 20. The output signal across terminals 22 and 24 of the bridge is coupled to the limiter 32 through the D.C. amplifier circuitry 33. The gain of amplifier 33 is such that an extremely small unbalance causes an error signal of sufficient amplitude to cause operation of limiter 32. As shown above, when the resistance 25 is undergoing a test to determine if its value is within the tolerance range determined by armatures 19 of switch 28, an error signal is produced which is amplified in circuit 33 and limited in circuit 32. If the resistance 25 under test is within tolerance, the error signal passed by the limiter 32 is alternating as heretofore explained, and this signal is amplified and rectified in circuit 34, and this output is utilized to actuate the accept mechanism of accept-reject relay 35. The output can also be utilized to pulse a counter 36, which would indicate the total number of accepted resistors.

When the resistor 25, which is under test, does not fall within the desired tolerance range, the error signal is of constant polarity which cannot be passed by the A.C. amplifier 34. Thus, the accept relay 35 is not actuated and the component is, therefore, rejected. The D.C. signal thus produced, is coupled over line 32a to actuate a relay 37. Each time relay 37 is actuated, a pulse is produced and coupled to a reject counter 38. The pulse output of D.C. relay 37 also actuates a step counter 39 so that, if at any time a pre-selected number of resistors in succession are rejected, a "machine stop" signal is generated. The step counter 39 is reset each time the amplifier 34 passes an accept signal also used as a reset signal to the counter 39 over line 40. It is evident that a switching rate other than 10 c.p.s. may be employed provided the A.C. amplifier is suitably altered to pass the new switching rate. Under certain circumstances, conventional "guard" circuits may be added if required.

Referring to Fig. 4, an alternate embodiment of the automatic limit bridge, adapted to test capacitive impedances, is shown to comprise a modified Wheatstone bridge arrangement. The bridge has preset limits wherein resistance 40 is adjusted to balance the bridge when the impedance of the unknown capacitor 41 is at the maximum value within the predetermined tolerance range, and the total of resistance 40 plus 42 is adjusted to balance the bridge when the impedance of capacitor 41 is at the minimum value within the tolerance range. Resistance 43 is equal to resistance 40 plus one-half of resistance 42, and the value of capacitor 44 is the nominal value of the capacitive impedance to be measured. Resistance 45 is utilized to make the Q of the standard capacitor 44 equal to the Q of the average capacitor to be tested. A commutating switch 46 is driven at a 10 c.p.s. rate by coupling the output of 10 c.p.s. source 47 to a motor 48. A source 53 of 1000 c.p.s. voltage is coupled across terminals 51 and 52 of the bridge.

The operation of the bridge shown in Fig. 4 is similar to the operation of the apparatus shown in Fig. 3. When the impedance of capacitor 41 is above or below the predetermined tolerance range, the error voltage coupled across terminals 49 and 50 is of constant phase, regardless of the position of switch 46 and only the amplitude of the error signal varies. When, however, the capacitance of element 41 is within the tolerance range, the phase of the error signal reverses each time the switch 46 is opened or closed. This error signal is amplified and limited in circuits 54 and 55, respectively, and fed through a phase sensitive demodulator 56 whose other input for phase comparison comprises a signal from source 47 via a phase shifter 63, adjusted to mean phase. When the error voltage is of constant phase, the output from the demodulator 56 is a constant polarity D.C. signal, but if the phase of the error signal voltage reverses, the output polarity of the demodulator 56 also reverses. Thus, a 10 c.p.s. A.C. signal results when a capacitor 41 is within predetermined tolerance limits and a D.C. signal results from the output of demodulator 56 when the capacitor 41 is outside those limits. The demodulated signal output is coupled to 10 c.p.s. A.C. amplifier 57 and rectified in circuit 58. The rectified signal actuates the accept relay 59 and an accept counter 60. Since neither D.C. nor 1000 c.p.s. A.C. can be passed by amplifier 57, only the 10 c.p.s. accept signal can close the accept relay 59. If the component, therefore, is outside the selected tolerance limits, it is rejected. When the capacitor 41 under test is outside the tolerance limits, a D.C. signal is produced at the output of demodulator 56. The signal output of demodulator 56, which is indicative of a rejected element, is utilized to operate the step counter 61 and reject counter 62 in a manner similar to the use of the D.C. control signal in the operation of the apparatus shown in Fig. 3. Clearly, the bridge can be used for measurement of inductive impedances by simple substitution of suitable standards.

It is, of course, obvious that in accordance with the well known Wheatstone bridge theory, the values of the arms may vary but the ratio of impedances should be maintained.

While I have described above the principles of my invention in connection with specific apparatus, it is to be clearly understood that this description is made by way of example only and not as a limitation to the scope of my invention as set forth in the objects thereof and in the accompanying claims.

I claim:

1. An apparatus for testing circuit elements having a fixed impedance, said apparatus comprising a Wheatstone bridge circuit including a first branch having means for connecting therein a circuit impedance element to be tested to determine whether its impedance is within a range of values between a minimum and a maximum value, a second branch including an impedance equal to a desired value between said minimum and maximum impedance values, a third branch including an impedance equal to a value between said minimum and maximum impedance values, and a fourth branch of said Wheatstone bridge having a plurality of impedances connected in series the sum of the impedance values thereof being equal to said maximum impedance value, one of said plurality of impedances in said fourth branch being equal to said minimum impedance value, a direct voltage source having one terminal connected to said Wheatstone bridge between said second and third branches and the other terminal of said direct voltage source connected between said first and fourth branches, an output circuit connected across the other two terminals of said Wheatstone bridge, said fourth branch including a shunt circuit including a switch connected across all said plurality of impedances in said fourth branch except said one impedance, means to open and close said switch at a fixed frequency to provide a positive current in said output circuit having a minimum value when said circuit impedance element to be tested has an impedance on one side of said impedance range and a negative current having a minimum value when the impedance of said circuit impedance element is on the other side of said impedance range, said output circuit including a limiter circuit having an operating range between said minimum values of said positive and negative currents for producing an alternating current output.

2. An apparatus for testing circuit elements having a fixed impedance, said apparatus comprising a Wheatstone bridge circuit including a first branch having means for connecting therein a circuit impedance element to be tested to determine whether its impedance is within a range of values between a minimum and a maximum value, a second branch including an impedance equal to a desired value between said minimum and maximum impedance values, a third branch including an impedance equal to a value between said minimum and maximum impedance values, and a fourth branch of said Wheatstone bridge having a plurality of impedances connected in series the sum of the impedance values thereof being equal to said maximum impedance value, one of said plurality of impedances in said fourth branch being equal to said minimum impedance value, a direct voltage source having one terminal connected to said Wheatstone bridge between said second and third branches and the other terminal of said direct voltage source connected between said first and fourth branches, an output circuit connected across the other two terminals of said Wheatstone bridge, said fourth branch including a shunt circuit including a switch connected across all said plurality of impedances in said fourth branch except said one impedance, means to open and close said switch at a fixed frequency to provide a positive current in said output circuit having a minimum value when said circuit impedance element to be tested has an impedance on one side of said impedance range and a negative current having a minimum value when the impedance of said circuit impedance element is on the other side of said impedance range, said output circuit including a limiter circuit having an operating range between said minimum values of said positive and negative currents for producing an alternating current output, and means responsive to said alternating current output to indicate an impedance value of said circuit impedance element between said minimum and maximum values of said impedance range.

References Cited in the file of this patent

UNITED STATES PATENTS

| | | |
|---|---|---|
| 1,932,337 | Dowling | Oct. 24, 1933 |
| 2,468,843 | Sunstein | May 3, 1949 |
| 2,482,196 | Marye | Sept. 20, 1949 |